Oct. 18, 1955  T. VIGMOSTAD  2,720,676
HINGE DEVICE

Filed July 22, 1950  2 Sheets-Sheet 1

INVENTOR.
Trygve Vigmostad
BY
Elmer Jamison Gray
ATTORNEY.

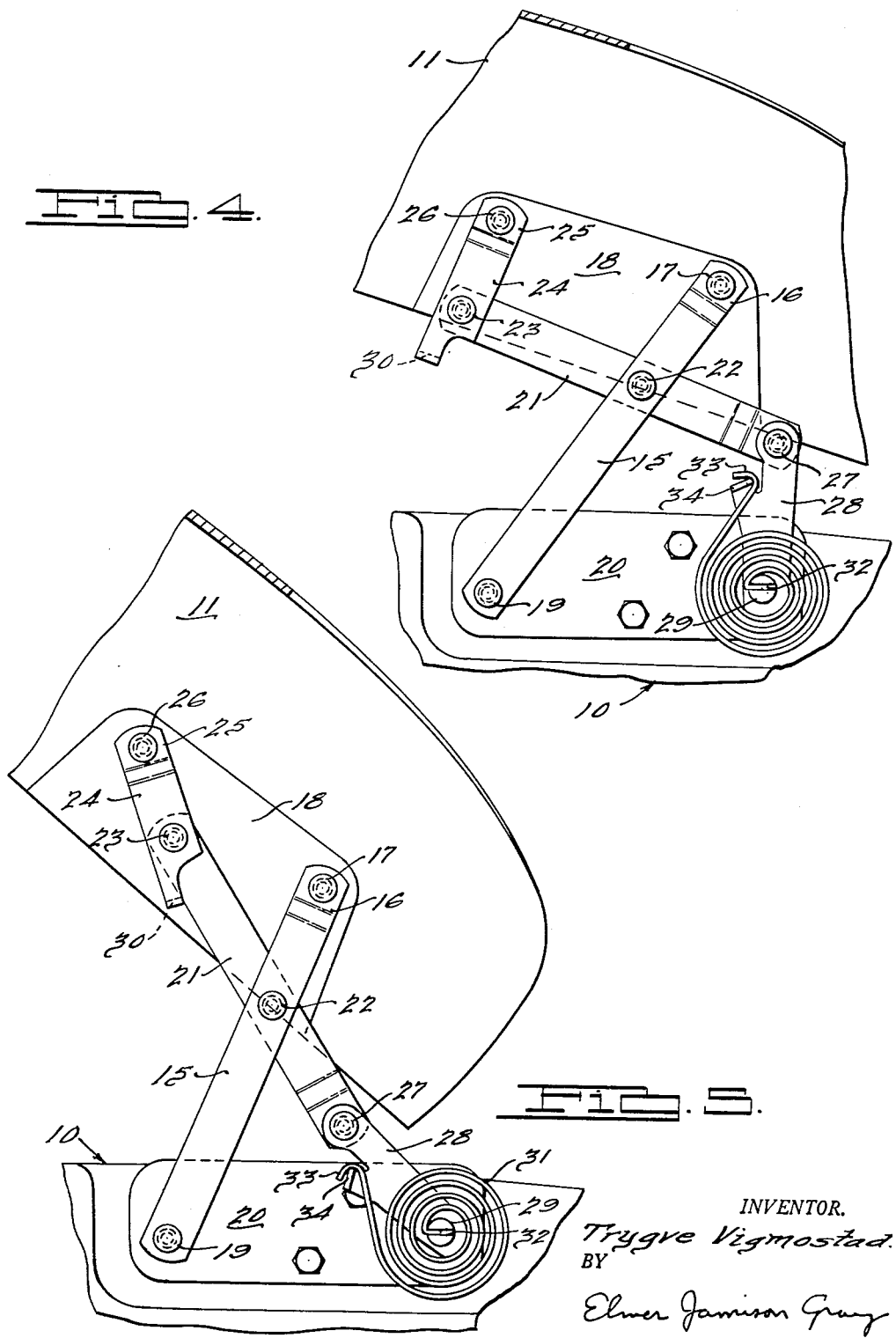

United States Patent Office 2,720,676
Patented Oct. 18, 1955

2,720,676

HINGE DEVICE

Trygve Vigmostad, Detroit, Mich., assignor to Briggs Manufacturing Co., Detroit, Mich., a corporation of Michigan Application July 22, 1950, Serial No. 175,352

5 Claims. (Cl. 16—163)

This invention relates to an improved hinge device which is particularly adapted for connecting the engine hood or bonnet of an automobile to the body structure to permit raising and lowering of the hood as required for access to the engine compartment. It is to be understood that the hinge embodying the present invention may also be employed with an automobile rear deck lid, or with other comparable swinging members wherein a hinge having the characteristics discussed below is required.

It is common practice in the construction of automobile bodies to provide a one piece pressed metal engine hood or bonnet which is raised or lowered from the front about a generally horizontal transverse hinge axis located near the rear of the hood. In this construction the rear edge of the hood usually closely overlies a forward portion of the automobile such as the cowl, in the nature of a batten or weather shield. As a result, when the hood is pivotally raised at the front end, it is also necessary to raise the hinge point simultaneously, otherwise the rear edge of the hood will dip downward and strike the underlying body structure.

It is accordingly an object of the present invention to provide an improved hinge device for an automobile hood or other swinging lid whereby, as the free end of the hood or lid is swung relative to the body, the hinged end will be simultaneously moved in a corresponding direction but to a lesser extent.

Another object is to provide an improved hinge device which is particularly but not exclusively adapted for use with an automobile engine hood or other swinging lid, whereby the forward end of the hood or lid may be raised as far as desired toward the vertical to permit freedom of access to the engine compartment without causing the rear end of the hood to move downward against the underlying body structure.

A further object is to provide a hinge device of the foregoing character for a swinging lid or closure, as for example an automobile hood or bonnet, wherein the lid or closure is urged closed by gravity until swung partially open and is thereafter counterbalanced substantially uniformly by spring means throughout the remainder of its movement, the counterbalancing effect gradually increasing as the lid approaches the fully open or raised position whereat the lid is firmly and surely held without danger of accidentally closing and without the necessity of setting a detent or latch means.

Still another object is to provide such a hinge device including an improved torsion spring actuated counterbalancing means for the hood which is adapted to unwind as the hood is raised and to hold the latter in any raised position throughout the major portion of the swinging movement, the hinge device being constructed so that as the hood is raised, the center of gravity of the hood will move rearward toward the hinge point, reducing the effective weight of the hood necessary to be counterbalanced substantially in the same proportion that the counterbalancing tension in the unwinding torsion spring is reduced.

Another and more specific object is to provide an improved hinge device comprising a rigid link pivotally connected at one end to a rear portion of an automobile hood or other swinging lid and pivotally connected at the other end to a fixed portion of the automobile body forward of the first pivot, and also comprising pivoting means operatively connecting the body and hood for pivotally raising and lowering the front end of the latter about the rearmost pivot, the pivoting means and link being cooperative so that forward or rearward pivoting of the link about the foremost pivot and the corresponding pivotal raising or lowering of the hood about the rearmost pivot will occur in unison. Thus, as the forward end of the hood is raised, the rear end of the latter will swing forward and upward with the link about the forward pivot to clear the underlying body portions.

Another object is to provide a hinge device of the foregoing character which is comparatively simple and sturdy in construction, reliable and efficient in operation, and economically manufactured and installed.

Other objects of this invention will appear in the following description and appended claims, reference being had to the accompanying drawings forming a part of this specification wherein like reference characters designate corresponding parts in the several views.

Fig. 4 is a fragmentary vertical section similar to Fig. 2, but showing the hinge device on a reduced scale in an intermediate raised position.

Fig. 5 is a view similar to Fig. 4, but showing the hinge device in the fully raised or open position.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
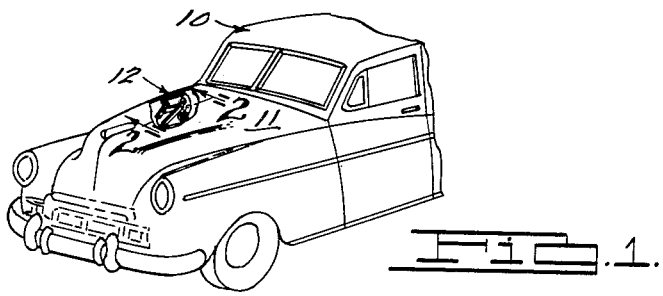
Fig. 1 is a fragmentary perspective view of the front end of an automobile with portions of the engine hood broken away to show the location of a hinge device constructed in accordance with the present invention.

Details of a preferred construction and application of the present invention are illustrated by way of example in the drawings wherein an automobile 10 is shown employing a one-piece engine hood 11 pivotally connected to fixed portions of the body 10 by a pair of hinge devices indicated generally by the numeral 12, Fig. 1. Inasmuch as each hinge 12 and mounting therefor is substantially the same as the other, the hinge 12 on only the right side of the vehicle is illustrated.

In accordance with customary automobile construction, the hood 11 is latched at its forward end to a fixed portion of the body 10 by means not shown and is pivotally raised or lowered from its front end about a generally horizontal transverse pivot axis near the rear of the hood. The rear edge of the hood 11 overlaps a recessed ledge 13 comprising a forward projection of a fixed cowl 14 integral with the automobile body proper immediately forward of the windshield structure, Figs. 1 and 2.

In order to raise the forward end of the hood 11 pivotally without depressing its rear end into the fixed cowl portion 13, each hinge device 12 includes a rigid rearwardly inclined swinging bar or control link 15 having an outwardly offset upper end 16 pivotally connected by a horizontal transverse pivot pin or rivet 17 to a vertical supporting bracket 18 near the rearward edge of the hood 11. The bracket 18 in turn is suitably adjustably secured to the underside of the hood 11. The lower end of the link 15 is pivotally connected by a pin 19 to a vertical bracket structure 20 of the body 10 to swing about a fixed axis parallel to the pin 17.

It is apparent that as the link 15 pivots about the pin 19, the upper end 16 and likewise the rear end of the hood 11 will be swung forward and upward. In order to elevate the front end of the hood 11 in unison with the forward and upward movement of the rear end, a cross link 21 is provided which is pivotally connected by a horizontal transverse pivot pin 22 to the link 15 intermediate the ends of both links 15 and 21. The forward end of the cross link 21 is pivotally connected by a transverse pin 23 to the lower end of a forward upper link 24. The upper end 25 of the latter is offset outwardly to lie adjacent the aforesaid bracket 18 and is pivotally secured thereto by a transverse pivot pin 26 at a location forward of the pivot 17 and substantially at the same level thereof when the hood 11 is in the closed position. The rearward end of the cross link 21 is pivotally connected by a transverse pivot pin 27 to the upper end of an operating link 28. The latter extends generally downward and forward in the closed position of the hood 11 and is pivotally connected at its lower end to the bracket 20 by means of a non-rotatable pivot pin 29 located rearwardly of the pin 19 and slightly above the latter.

By virtue of the linkage thus far described, the forward upper link 24 and the portion of the cross link 21 forward of the pivot 22 comprise in effect a toggle articulated at 23. Upon straightening the toggle as indicated in Figs. 4 and 5, the forward end of the hood 11 is rapidly elevated about the pivot 17. Also as the control link 15 is initially swung upward and forward about the pivot 19, the operating link 28 connected to the rearward end of the cross link 21 swings forward and upward in a pivotal movement around the lower pivot 29.

The distance between the pivots 27 and 29 is somewhat less than the distance between the pivots 19 and 22, so that the latter pivot will be elevated more rapidly than the pivot 27 upon forward swinging of the control link 15. Accordingly, upon such forward swinging the cross link 21 will pivot clockwise about the pivot 22 and straighten the aforesaid toggle knee 23, thereby swinging the forward end of the hood 11 rapidly upward with respect to the rear end. The reverse movements will of course occur upon closure of the hood 11.

Likewise, by the structure shown, after the initial upward movement of the rear end of the hood 11, and as the rearward edge thereof clears the recessed cowl projection 13, the pivot 27 will approach the crest of its movement about the pivot 29 and the component of vertical movement of the pivot 27 will practically cease. The pivot 22 will continue to move upward and forward, so that the knee 23 wil straighten abruptly and swing the forward end of the hood 11 rapidly upward to substantially a vertical position, Fig. 5. The upper limit of movement is determined by a stop or projection 30 extending downward and outward from the lower end of the link 24 so as to engage the link 21 just before these links reach linear alignment, Fig. 5.

In order to counterbalance the weight of the hood 11, a torsion spring 31 is secured at its inner end within a diametrical slot 32 in an extension of the non-rotatable pin 29. The spring 31 is wound clockwise under tension about the pin 29 to its outer end which is looped at 33 over a transverse projection 34 of the operating link 28. Thus the spring 31 exerts a continuous force tending to drive the link 28 counterclockwise or forward, Figs. 2, 4 and 5.

Figure 2:
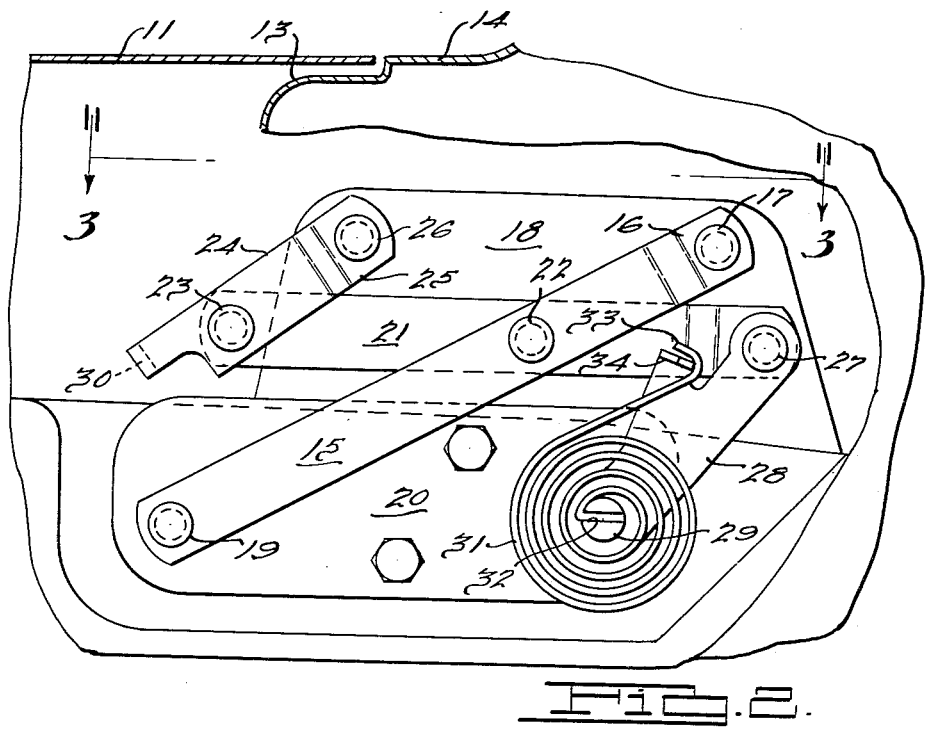
Fig. 2 is a fragmentary enlarged vertical section taken in the direction of the arrows substantially along the line 2—2 of Fig. 1, showing an inside elevation of the hinge device of Fig. 1 in the closed position.
Figure 3:
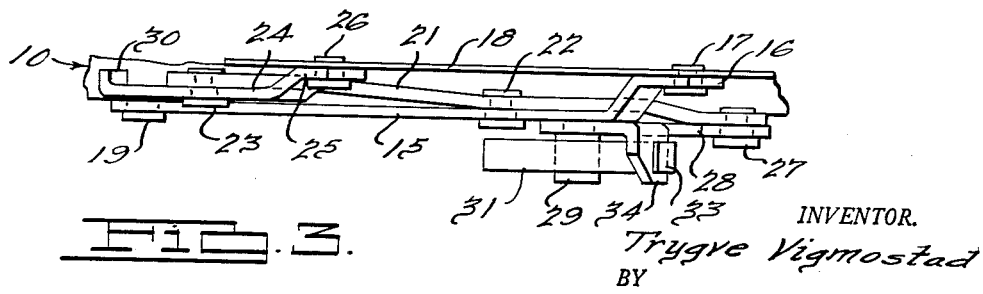
Fig. 3 is a fragmentary horizontal section taken in the direction of the arrows substantially along the line 3—3 of Fig. 2.

Referring particularly to the latter figures, it is to be noted that upon the initial forward swinging of the link 15 from the closed position, Fig. 2, the hood 11 and cross link 21 are elevated directly with a minimum of swinging movement. The length of the link 15 determines the extent of elevation of the pivot 17 for a given arc of swinging about the pivot 19.

After the initial opening movement to approximately the position of Fig. 4, the pivots 17 and 27 approach their crests of vertical movement and the double toggle members comprising the links 21, 24 and 21, 28 rapidly unfold to a straightened position, swinging the cross-link 21 through a comparatively large angle from the initial horizontal position and causing the front end of the hood 11 to swing rapidly to the raised position, Fig. 5.

During this movement the counterbalancing tension of the unwinding spring 31 decreases. Simultaneously the center of gravity of the hood 11 moves rearward toward a position over the pivot 17 so as to decrease the leverage afforded to the weight of the hood 11 resisting the counterbalancing spring force. Likewise as the toggles 21, 24 and 21, 28 approach the straightened condition, their leverage assisting the spring 31 to swing the hood 11 upward about the pivot 17 and to prevent rearward swinging of the link 15 increases enormously. Accordingly by virtue of the hinge linkage shown, the resiliency and initial tension of the spring 31 may be suitably determined so that the loss of counterbalancing tension upon unwinding of the spring 31 will be substantially compensated for by the combined effects of the increasing toggle leverage and the rearward shift of the center of gravity, thereby effectively counterbalancing the hood throughout the major portion of its movement. Finally at the raised position of the hood, the counterbalancing leverage of the nearly straightened toggles enables the spring 31 to hold the hood 11 firmly and securely against accidental downward movement.

Upon closure of the hood, the latter will be substantially counterbalanced as aforesaid throughout its major movement. As the hood 11 approaches the closed position, Fig. 4, its rate of swinging movement decreases and its full weight is directed against the spring 31 through the hinge linkage. Accordingly although the tension of the spring 31 approaches a maximum as the hood completes the last few inches of closing movement, the counterbalancing effectiveness of the spring 31 approaches a minimum by reason of the reduced leverage. The last few inches of closure movement of the hood 11 against the customary latch mechanism which holds the hood closed may thus be readily accomplished with a minimum of manual effort. By virtue of the crossing links 15, 21, the hinge linkage shown firmly holds the hinge edge of the hood 11 rigid against play or movement when the front end of the hood is suitably latched in the closed position.

I claim:

1. In a swinging structure for a vehicle body having a front hood, means hingedly connecting said hood adjacent the rear thereof to said body for swinging the front of said hood vertically between open and closed positions comprising a vertically swinging operating link having a lower end pivotally connected to the body adjacent and below the rear end of the hood and being inclined rearwardly when the hood is in the closed position, a vertically swinging control link having a lower end pivotally connected to the body at a location forward of the pivotal connection between the body and operating link and having an upper end pivotally connected to the hood adjacent the latter's rear end, a vertically swinging forward link having an upper end pivotally connected to the hood at a location in advance of the pivotal connection between the hood and control link, a vertically swinging cross link pivoted on the control link intermediate the ends of these latter two links and having rearward and forward ends pivoted on an upper end of the operating link and a lower end of the forward link respectively, spring means operatively connecting said body and swinging structure under tension yieldingly urging said hood to the open position, movement limiting means operatively connected to said body and swinging structure to block upward swinging of said hood beyond the open position, the center of gravity of said hood at the open position being forward of the upper pivotal connection of said control link, and the lower pivotal connection of the control link being forward of the latter's arc of swinging movement between the open and closed positions of the hood.

2. The combination as set forth in claim 1 and being further characterized in that the spacing of the lower pivotal connection of the control link forwardly of the pivotal connection between the operating link and body is greater than the length of the operating link and also greater than the length of the portion of the cross link between its pivotal connections with said control and operating links.

3. The combination as set forth in claim 2 and being further characterized in that said cross link is generally horizontal and meets said forward and operating links at acute angles when the hood is at the closed position, and when the hood is at the open position the lower pivotal connections of said control and operating links together with the pivotal connection between said control and cross links complete a triangle having all acute angles, and said spring means comprises a torsion spring coaxial with the pivotal connection between said operating link and body and connectnig said body and operating link under tesion yieldingly urging the latter pivotally forward.

4. The combination as set forth in claim 1 and being further characterized in that at the open position of the hood the operating and cross links incline forwardly substantially in end-to-end alignment, the total length of the operating link and the portion of the cross link rearward of its pivotal connection with the control link is less than the distance from the lower pivotal connection of the operating link to a point directly above the lower pivotal connection of the control link and spaced from the latter pivotal connection by a distance equal to the distance between that latter pivotal connection and the pivotal connection between the operating and cross links, and at the closed position of the hood, said forward link being inclined rearwardly and said forward and operating links making acute angles with said cross link.

5. The combination as set forth in claim 1 and being further characterized in that at the open position of the hood the operating and cross links incline forwardly substantially in end-to-end alignment, the distance from the lower pivotal connection of the operating link to the pivotal connection between the cross and control links is less than the distance from the lower pivotal connection of the operating link to a point directly above the lower pivotal connection of the control link and spaced from the latter pivotal connection by a distance equal to the distance between that latter pivotal connection and the pivotal connection between the operating and cross links, and also the lower pivotal connections of said control and operating links together with the pivotal connection between said control and cross links comprise a triangle having all acute angles, said spring means comprises a torsion spring coaxial with the pivotal connection between said opearting link and body and connecting said body and operating link under tension yieldingly urging the latter pivotally forward, and at the closed position of the hood said forward link is inclined rearwardly and said forward and operating links meet said cross link at acute angles.

References Cited in the file of this patent

UNITED STATES PATENTS

| | | |
|---|---|---|
| Re. 23,191 | Riley | Jan. 17, 1950 |
| 758,530 | Gross | Apr. 26, 1904 |
| 2,185,214 | Claud-Mantle | Jan. 2, 1940 |
| 2,258,065 | De Orlow | Oct. 7, 1941 |
| 2,272,230 | Van Voorhees | Feb. 10, 1942 |
| 2,317,892 | De Orlow | Apr. 27, 1943 |
| 2,320,752 | Roethel | June 1, 1943 |
| 2,580,593 | Putnam | Jan. 1, 1952 |